United States Patent
Namiki et al.

(10) Patent No.: US 11,748,977 B2
(45) Date of Patent: Sep. 5, 2023

(54) IMAGE PROCESSING SYSTEM, IMAGE PROCESSING DEVICE, IMAGE PROCESSING METHOD, AND COMPUTER-READABLE MEDIUM

(71) Applicant: NEC Corporation, Tokyo (JP)

(72) Inventors: Shigeaki Namiki, Tokyo (JP); Takashi Shibata, Tokyo (JP); Shoji Yachida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 162 days.

(21) Appl. No.: 17/438,632

(22) PCT Filed: Mar. 22, 2019

(86) PCT No.: PCT/JP2019/012083
§ 371 (c)(1),
(2) Date: Sep. 13, 2021

(87) PCT Pub. No.: WO2020/194378
PCT Pub. Date: Oct. 1, 2020

(65) Prior Publication Data
US 2022/0351497 A1    Nov. 3, 2022

(51) Int. Cl.
*G06V 10/766*    (2022.01)
*G06V 10/82*    (2022.01)
(Continued)

(52) U.S. Cl.
CPC ............. *G06V 10/766* (2022.01); *G06T 7/20* (2013.01); *G06V 10/764* (2022.01); *G06V 10/82* (2022.01)

(58) Field of Classification Search
CPC .... G06V 10/766; G06V 10/82; G06V 10/764; G06T 7/20
See application file for complete search history.

(56) References Cited

U.S. PATENT DOCUMENTS

2011/0010317 A1   1/2011   Ito et al.
2016/0321522 A1*  11/2016  Yuan ..................... G06F 18/214
(Continued)

FOREIGN PATENT DOCUMENTS

JP    2007-328435 A    12/2007
JP    2010-165046 A    7/2010
(Continued)

OTHER PUBLICATIONS

International Search Report for PCT Application No. PCT/JP2019/012083, dated May 21, 2019.
(Continued)

*Primary Examiner* — Utpal D Shah
(74) *Attorney, Agent, or Firm* — Sughrue Mion, PLLC

(57) ABSTRACT

A system includes: a sequential image string input unit configured to input a sequential image string having sequentiality; a reference image selection unit configured to select one or more images from the sequential image string as reference images; a variation calculation unit configured to select an adjacent reference image adjacent to the reference image from the sequential image string and calculate a variation between the reference image and the adjacent reference image; an image information regression unit configured to calculate class confidence by regression processing with the reference image as an input; a difference image information regression unit configured to calculate class confidence by regression processing with the variation as an input; a confidence integration unit configured to integrate class confidence calculated by the image information regression unit and class confidence calculated by the difference image information regression unit; and an output unit configured to output the integrated class confidence.

7 Claims, 7 Drawing Sheets

(51) Int. Cl.
G06V 10/764 (2022.01)
G06T 7/20 (2017.01)

(56) References Cited

U.S. PATENT DOCUMENTS

| | | | |
|---|---|---|---|
| 2018/0268292 A1* | 9/2018 | Choi | G06V 10/454 |
| 2020/0106930 A1 | 4/2020 | Hohjoh | |
| 2020/0175384 A1* | 6/2020 | Zhang | G06N 3/088 |
| 2020/0250514 A1* | 8/2020 | Kim | G06F 18/251 |
| 2021/0215481 A1* | 7/2021 | Zhai | G06V 10/25 |

FOREIGN PATENT DOCUMENTS

| | | |
|---|---|---|
| JP | 2011-018996 A | 1/2011 |
| JP | 2011-205387 A | 10/2011 |
| WO | 2018/230294 A1 | 12/2018 |

OTHER PUBLICATIONS

Geoffrey Hinton et al., "Distilling the knowledge in a neural network", arXiv preprint arXiv:1503.02531v1, Mar. 9, 2015, pp. 1-9.

Takagaki Yukihide et al., "Online Human Action Detection using Deep Spatio-temporal Transformation", IEICE Technical Report, Oct. 5, 2017, vol. 117, No. 238, pp. 31-35.

* cited by examiner

IMAGE PROCESSING SYSTEM, IMAGE PROCESSING DEVICE, IMAGE PROCESSING METHOD, AND COMPUTER-READABLE MEDIUM

This application is a National Stage Entry of PCT/JP2019/012083 filed on Mar. 22, 2019, the contents of all of which are incorporated herein by reference, in their entirety.

TECHNICAL FIELD

The present disclosure relates to an image processing system, an image processing device, an image processing method, and a computer-readable medium and particularly relates to a technology for reducing a computational load in image processing based on machine learning including deep learning.

BACKGROUND ART

Many techniques using deep learning have been proposed in the field of image processing such as image recognition and image matching. Use of deep learning allows highly-precise recognition of a person or an object from an image of the person or the object, highly precise restoration of an image, and the like. However, a model (a network structure used in deep learning) in the techniques using deep learning are generally large-scale and therefore requires a large amount of computation. Therefore, there is a problem that a very heavy computational load is required when a dynamic image with a high frame rate, such as that acquired by using a high-speed camera, a group of images of an object captured under a plurality of lighting conditions, or the like is input.

In order to solve such a problem, Non Patent Literature 1 discloses a technique referred to as distilled learning for generating a model requiring a lighter computational load (may be hereinafter referred to as a student model) from an already-learned high-precision model (may be hereinafter referred to as a teacher model). Specifically, Non Patent Literature 1 discloses a technique for, by using information indicating how learning data are generalized (may be hereinafter referred to as privileged information), achieving successful rapid convergence and acquiring a student model precision of which is close to that of a teacher model, by causing the student model to learn the learning data with the privileged information as a key.

CITATION LIST

Non Patent Literature

Non Patent Literature 1: Geoffrey Hinton, Oriol Vinyals, and Jeff Dean, "Distilling the knowledge in a neural network," arXiv preprint arXiv:1503.02531v1 (9, Mar., 2015)

SUMMARY OF INVENTION

Technical Problem

However, when a dynamic image with a high frame rate acquired by using a high-speed camera, a group of images of an object captured under a plurality of lighting conditions, or the like is input, the technique described in Non Patent Literature 1 has a problem that since inference based on application of a student model to every input image is required, an amount of redundant computation is large and a computational load is heavy.

Then, an object of the present disclosure is to provide an image processing system, an image processing device, an image processing method, and a computer-readable medium that can solve the aforementioned problem and enable image processing with a lighter computational load on a sequential image string having sequentiality.

Solution to Problem

An image processing system according to an embodiment includes:

a sequential image string input unit configured to input a sequential image string having sequentiality;

a reference image selection unit configured to select one or more images from the sequential image string as reference images;

a first variation calculation unit configured to select an adjacent reference image adjacent to the reference image from the sequential image string and calculate a first variation being a variation between the reference image and the adjacent reference image;

an image information regression unit configured to calculate class confidence by regression processing with the reference image as an input;

a difference image information regression unit configured to calculate class confidence by regression processing with the first variation as an input;

a confidence integration unit configured to integrate class confidence calculated by the image information regression unit and class confidence calculated by the difference image information regression unit; and an output unit configured to output the integrated class confidence.

An image processing device according to an embodiment includes:

a sequential image string input unit configured to input a sequential image string having sequentiality;

a reference image selection unit configured to select one or more images from the sequential image string as reference images;

a first variation calculation unit configured to select an adjacent reference image adjacent to the reference image from the sequential image string and calculate a first variation being a variation between the reference image and the adjacent reference image;

an image information regression unit configured to calculate class confidence by regression processing with the reference image as an input;

a difference image information regression unit configured to calculate class confidence by regression processing with the first variation as an input;

a confidence integration unit configured to integrate class confidence calculated by the image information regression unit and class confidence calculated by the difference image information regression unit; and an output unit configured to output the integrated class confidence.

An image processing method according to an embodiment is an image processing method by an image processing device and includes:

a step of inputting a sequential image string having sequentiality;

a step of selecting one or more images from the sequential image string as reference images;

a step of selecting an adjacent reference image adjacent to the reference image from the sequential image string and calculating a first variation being a variation between the reference image and the adjacent reference image;

a first regression step of calculating class confidence by regression processing with the reference image as an input;

a second regression step of calculating class confidence by regression processing with the first variation as an input;

a step of integrating class confidence calculated by the first regression step and class confidence calculated by the second regression step; and a step of outputting the integrated class confidence.

A computer-readable medium according to an embodiment stores an image processing program for causing a computer to execute:

a procedure for inputting a sequential image string having sequentiality;

a procedure for selecting one or more images from the sequential image string as reference images;

a procedure for selecting an adjacent reference image adjacent to the reference image from the sequential image string and calculating a first variation being a variation between the reference image and the adjacent reference image;

a first regression procedure for calculating class confidence by regression processing with the reference image as an input;

a second regression procedure for calculating class confidence by regression processing with the first variation as an input;

a procedure for integrating class confidence calculated by the first regression procedure and class confidence calculated by the second regression procedure; and a procedure for outputting the integrated class confidence.

Advantageous Effects of Invention

The aforementioned embodiments can provide an effect of providing an image processing system, an image processing device, an image processing method, and a computer-readable medium that enable image processing on a sequential image string having sequentiality with a lighter computational load.

DESCRIPTION OF EMBODIMENTS

Example embodiments of the present disclosure will be described in detail below with reference to drawings. For clarification of description, the following description and drawings are abbreviated and simplified as appropriate. Further, in each drawing, the same components are given the same sign, and redundant description thereof is omitted as needed.

Configuration of Example Embodiment

Figure 1:
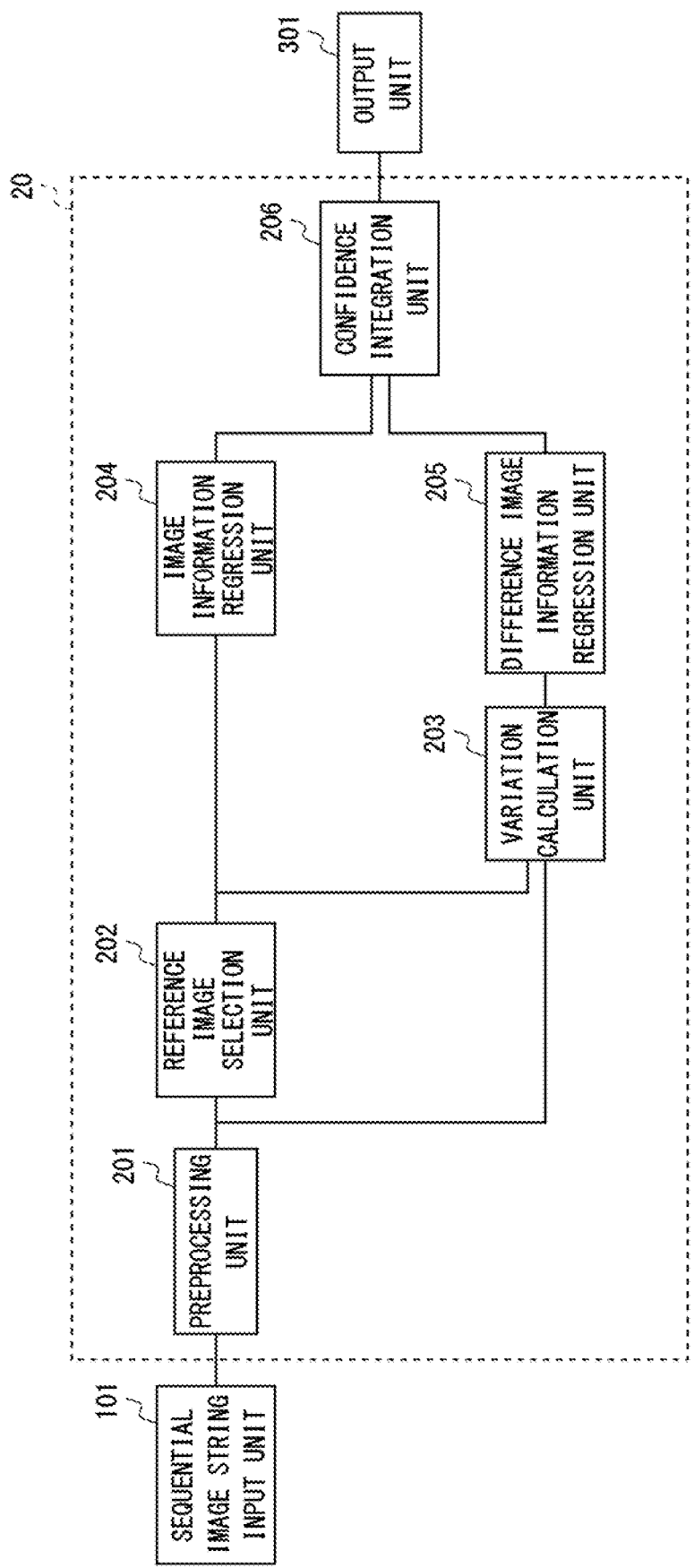
FIG. 1 is a block diagram illustrating a schematic configuration example of an inference execution unit in an image processing system according to an example embodiment of the present disclosure.

First, a schematic configuration of an inference execution unit in an image processing system according to an example embodiment of the present disclosure will be described with reference to FIG. 1. FIG. 1 is a block diagram illustrating a schematic configuration example of the inference execution unit in the image processing system according to the present example embodiment.

Referring to FIG. 1, the inference execution unit in the image processing system according to the present example embodiment includes a sequential image string input unit 101, an inference processing unit 20, and an output unit 301. The inference processing unit 20 includes a preprocessing unit 201, a reference image selection unit 202, a variation calculation unit 203, an image information regression unit 204, a difference image information regression unit 205, and a confidence integration unit 206.

While details will be described later, the image information regression unit 204 in FIG. 1 uses an image information regression function, and the difference image information regression unit 205 in FIG. 1 uses a difference image information regression function.

The aforementioned difference image information regression function and image information regression function may be manually input by a user in advance.

Alternatively, the aforementioned difference image information regression function and image information regression function may be estimated by the image processing system according to the present example embodiment by learning. In this case, a learning execution unit with a configuration illustrated in FIG. 2 is added to the image processing system according to the present example embodiment.

Figure 2:
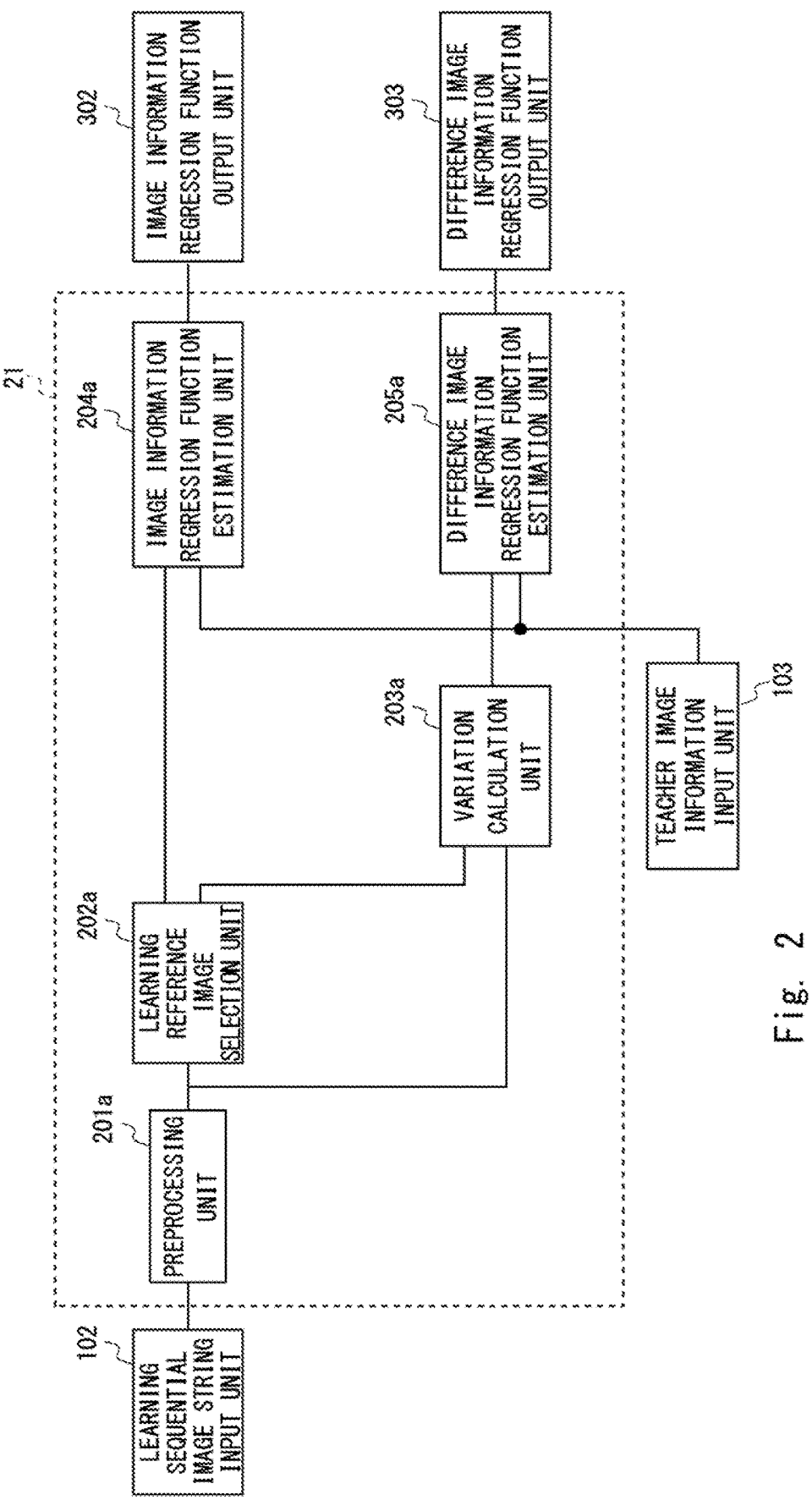
FIG. 2 is a block diagram illustrating a schematic configuration example of a learning execution unit in the image processing system according to the example embodiment of the present disclosure.

FIG. 2 is a block diagram illustrating a schematic configuration example of the learning execution unit in the image processing system according to the present example embodiment.

Referring to FIG. 2, the learning execution unit in the image processing system according to the present example embodiment includes a learning sequential image string input unit 102, a teacher image information input unit 103, a learning processing unit 21, an image information regression function output unit 302, and a difference image information regression function output unit 303. The learning processing unit 21 includes a preprocessing unit 201a, a learning reference image selection unit 202a, a variation calculation unit 203a, an image information regression function estimation unit 204a, and a difference image information regression function estimation unit 205a.

While details will be described later, the image information regression function estimation unit 204a in FIG. 2 estimates an image information regression function, and the difference image information regression function estimation unit 205a in FIG. 2 estimates a difference image information regression function. Therefore, an image information regression function estimated by the image information regression function estimation unit 204a in FIG. 2 may be used by the image information regression unit 204 in FIG. 1. A difference image information regression function estimated by the difference image information regression function estimation unit 205a in FIG. 2 may be used by the difference image information regression unit 205 in FIG. 1.

In other words, the inference execution unit in the image processing system illustrated in FIG. 1 corresponds to processing of executing inference in common image processing. The learning execution unit in the image processing system illustrated in FIG. 2 corresponds to processing of executing learning (or processing of executing inference) in common image processing.

An outline of each component in the image processing system according to the present example embodiment will be described below.

First, an outline of each component in the inference execution unit in the image processing system illustrated in FIG. 1 will be described.

Sequential Image String Input Unit 101

The sequential image string input unit 101 inputs a sequential image string having sequentiality. For example, a sequential image string herein refers to one or more dynamic images captured by a video camera or a high-speed camera. Alternatively, for example, a sequential image string herein may be a series of image strings captured with varying poses of a subject such as a face, a person, or an object. Alternatively, for example, a sequential image string herein may be a series of image strings of a subject such as a face, a person, or an object captured with varying positions of lighting or a camera. Alternatively, a sequential image string herein may be a multispectral image or a hyperspectral image of a subject such as a face, a person, or an object captured in a plurality of spectral bands. In other words, a sequential image string herein may be any sequential image string acquired by temporally or spatially varying a subject or an image capture environment, based on a certain rule.

Sequential images are hereinafter denoted by a vector $I(t)=(I_1(t), I_2(t), \ldots, I_n(t), \ldots, I_N(t))$. Note that t is a parameter for ordering the sequence and may be, for example, a time, an angle of lighting or a pose, a pose of an object, or a frequency of a spectrum. Note that t may be hereinafter referred to as a sequential parameter. Further, a subscript is an index representing an index of a pixel. N is the number of pixels in an image. While an example that a sequential data string having sequentiality includes images will be described in the present example embodiment for clarification of description, the present example embodiment is not premised on a sequential data string including images. For example, a sequential data string may include voice signals composed of N elements instead of images or may include unstructured data such as customer data. In other words, a sequential data string may include any data composed of N elements.

Preprocessing Unit 201

The preprocessing unit 201 converts a sequential image string input by the sequential image string input unit 101 into images more suitable for image recognition by performing preprocessing (image processing) on the sequential image string. For example, preprocessing herein may be multi-frame super-resolution, single-frame super-resolution, high-dynamic-range image composition, contrast enhancement, or multi-frame noise reduction.

Reference Image Selection Unit 202

The reference image selection unit 202 selects one or more images from a sequential image string preprocessed by the preprocessing unit 201 as reference images. For example, the reference image selection unit 202 may select an image with the minimum t from the sequential image string as a reference image. Alternatively, the reference image selection unit 202 may randomly select an image from the sequential image string as a reference image. Alternatively, the reference image selection unit 202 may select a reference image predetermined by a user. Alternatively, for example, the reference image selection unit 202 may previously calculate a quantity characterizing an image, such as lightness or blurring intensity, for each image in the sequential image string and may preferentially select an image having a larger or smaller value of the quantity as a reference image. Then, the reference image selection unit 202 records the selected reference image into a memory (unillustrated). A reference image selected by the reference image selection unit 202 is hereinafter denoted by a vector $Ii=I(ti)=(I_1(ti), I_2(ti), \ldots, I_n(ti), \ldots, I_N(ti))$. An index i is for distinguishing between selected reference images.

Variation Calculation Unit 203

The variation calculation unit 203 calculates a variation between a reference image selected by the reference image selection unit 202 and an adjacent reference image being an image adjacent to the reference image.

First, from a sequential image string preprocessed by the preprocessing unit 201, the variation calculation unit 203 selects one or more images belonging to a sequence close to a reference image selected by the reference image selection unit 202 as adjacent reference images. More specifically, for example, the variation calculation unit 203 may preferentially select one or more sequential images having sequential parameters close to a sequential parameter ti of the reference image from the sequential image string and select the images as adjacent reference images. Alternatively, the variation calculation unit 203 may first randomly select images from the sequential image string and then select one or more images having sequential parameters close to the sequential parameter ti of the reference image from the randomly selected images as adjacent reference images. When a plurality of images are selected as adjacent reference images, the adjacent reference images are hereinafter distinguished by j in order to distinguish between the plurality of adjacent reference images. However, a case that one image is selected as an adjacent reference image by the variation calculation unit 203 will be described below. Further, an adjacent reference image selected by the variation calculation unit 203 is hereinafter denoted by $Iij=I(tj)$.

Figure 3:
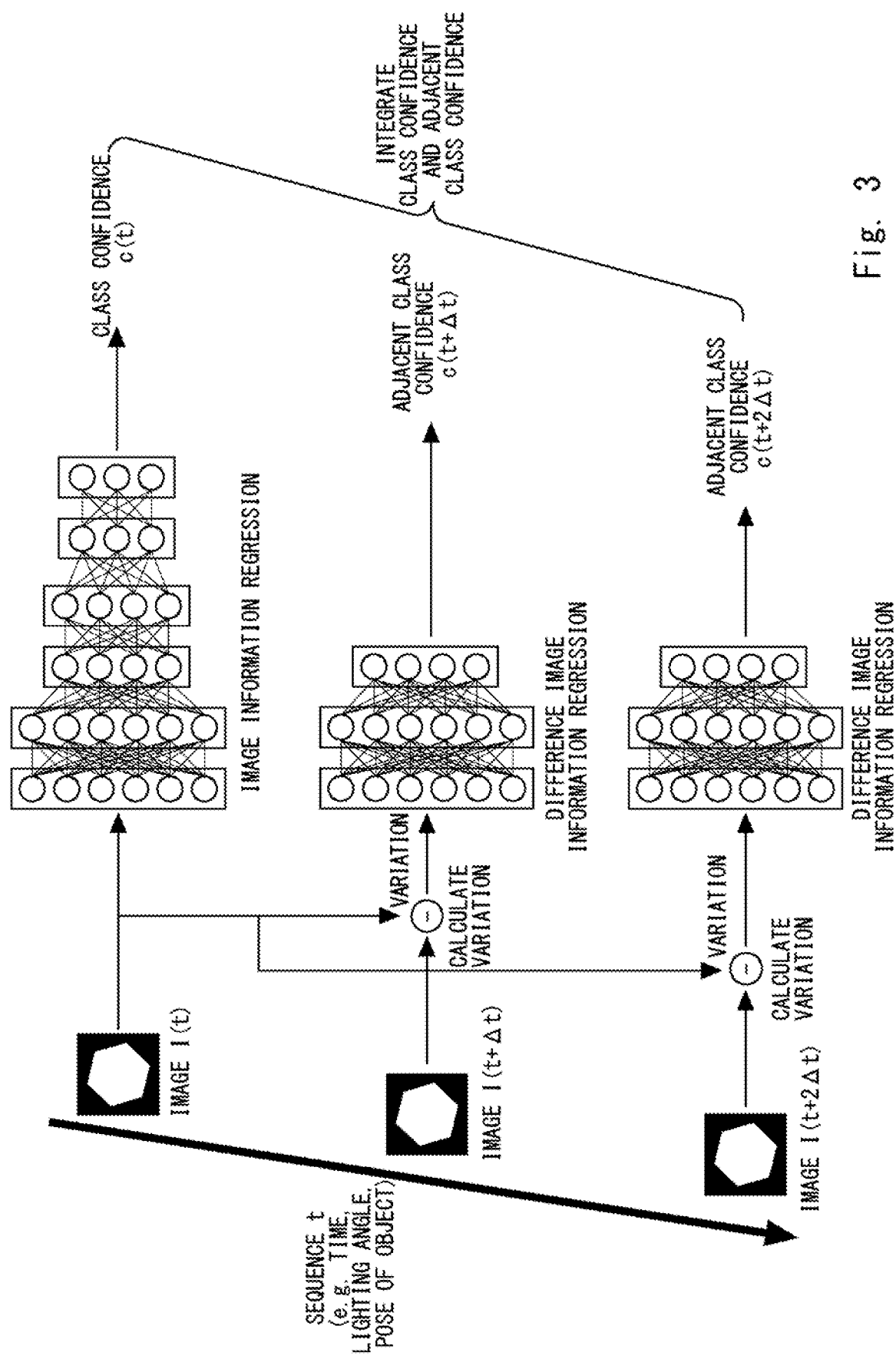
FIG. 3 is a diagram illustrating an example of a relation between a reference image and an adjacent reference image.

A relation between a reference image and an adjacent reference image may be a relation illustrated in FIG. 3. Specifically, the reference image selection unit 202 selects an image in a specific frame as a reference image. The variation calculation unit 203 selects an image in a frame subsequent to the reference image as an adjacent reference image and calculates a variation between the reference image and the adjacent reference image. The variation calculation unit 203 may successively select images in frames after the current adjacent reference image as adjacent reference images, calculate a variation between a selected adjacent reference image and the reference image, and repeat the operation from then on. In other words, a variation may be determined as a variation between a reference image and an adjacent reference image.

Figure 4:
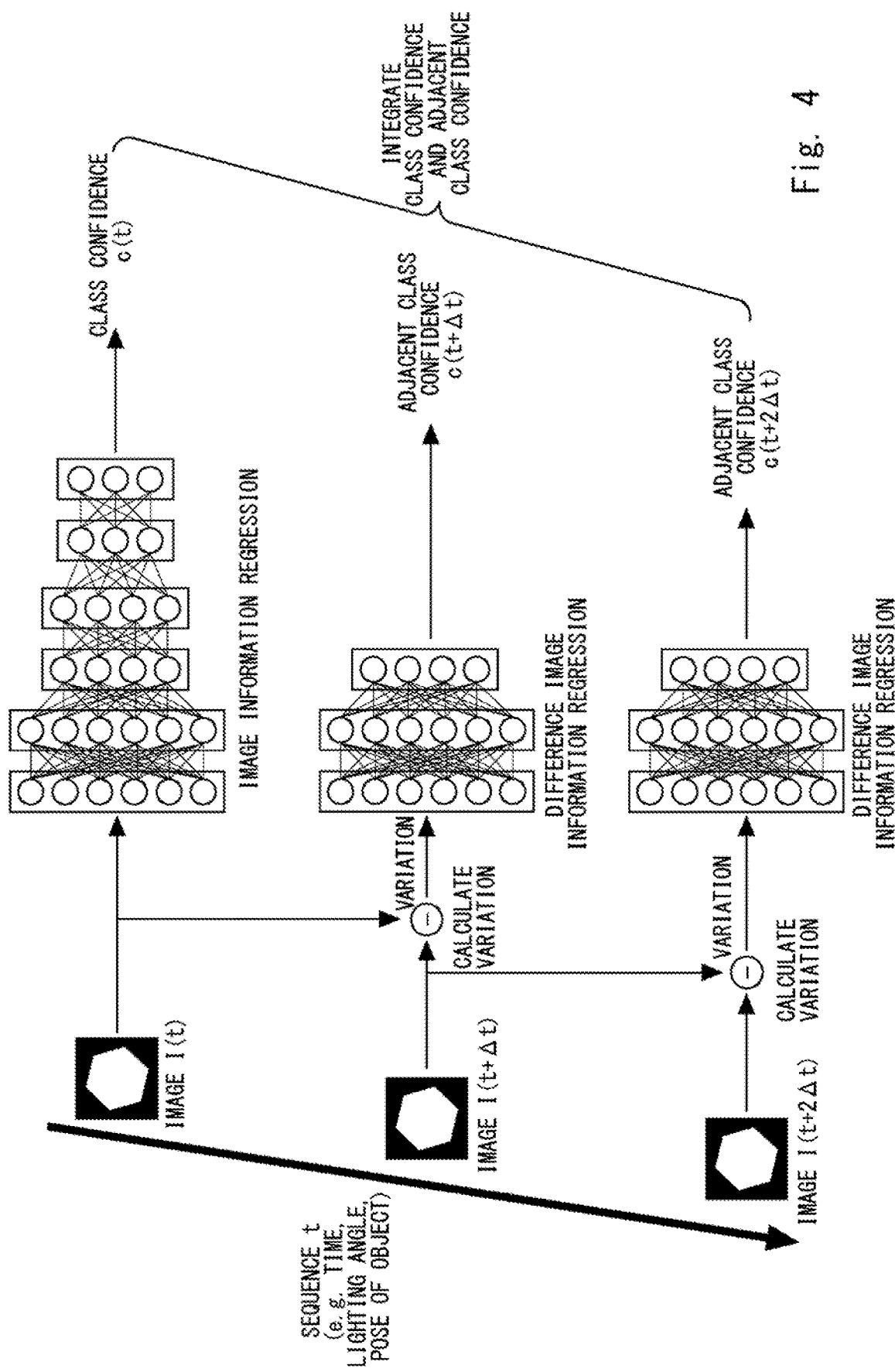
FIG. 4 is a diagram illustrating another example of a relation between a reference image and an adjacent reference image.

Alternatively, a relation between a reference image and an adjacent reference image may be a relation illustrated in FIG. 4. Specifically, the reference image selection unit 202 selects an image in a specific frame as a reference image. The variation calculation unit 203 selects an image in a frame subsequent to the reference image as an adjacent reference image and calculates a variation between the reference image and the adjacent reference image. The variation calculation unit 203 may successively select images in frames after the current adjacent reference image as adjacent reference images, calculate a variation between a selected adjacent reference image and an adjacent reference image in an immediately preceding frame, and repeat the operation from then on. In other words, a variation may be determined as a variation between an image and an image preceding the image.

Alternatively, the aforementioned two selection methods may be integrated and be used as a relation between a reference image and an adjacent reference image.

A variation herein refers to a quantity representing a change between a reference image and an adjacent reference image or a change between adjacent reference images. Specifically, for example, the variation calculation unit 203 may determine the difference value between pixel values of a reference image and an adjacent reference image, a squared value of the difference value, or an absolute value of the difference value as a variation. Alternatively, the variation calculation unit 203 may convert the difference value between pixel values of a reference image and an adjacent reference image by using a linear function or a nonlinear function and determine the converted value as a variation. Alternatively, the variation calculation unit 203 may calculate values acquired by converting each of a pixel value of a reference image and a pixel value of an adjacent reference image by using a linear function or a nonlinear function and determine the difference value between the converted values as a variation or may determine a value acquired by further converting the difference value between the converted values by using a linear function or a nonlinear function as a variation. Alternatively, the variation calculation unit 203 may calculate a variation by using a function taking a pixel value of a reference image and a pixel value of an adjacent reference image as arguments or may calculate a variation by using a function determining a correlation value such as a normalized cross-correlation. Alternatively, the variation calculation unit 203 may calculate a geometric transformation or an amount of movement (that is, an optical flow) of an image from a pixel value of a reference image and a pixel value of an adjacent reference image and determine the calculated value as a variation. The calculation method of a variation by the variation calculation unit 203 according to the present example embodiment is not limited to the above and may be any calculation method using a function taking a pixel value of each of a reference image and an adjacent reference image as an argument. Further, while the aforementioned calculation method is a calculation method of a variation between a reference image and an adjacent reference image, a variation between adjacent reference images may also be calculated by a similar method. A variation calculated by the variation calculation unit 203 is hereinafter denoted by $\Delta I_{ij}$ and may be simply referred to as a variation.

Alternatively, a variation calculated by the variation calculation unit 203 may be acquired by adding information about a reference image or an adjacent reference image to information about a variation being a change between the reference image and the adjacent reference image, or a change between the adjacent reference images. Alternatively, a variation calculated by the variation calculation unit 203 may be acquired by adding information about a reference image and an adjacent reference image to a variation calculated in the past.

Image Information Regression Unit 204

The image information regression unit 204 calculates class confidence by an image information regression function with a reference image selected by the reference image selection unit 202 as an input. For example, class confidence herein refers to a matching result or a recognition result. More specifically, for example, when class confidence is a matching result, a degree of difference or a degree of similarity between an input reference image and a separately prepared image corresponds to class confidence. When class confidence is a recognition result, information about an object, a person, a character, or the like included in an input reference image corresponds to class confidence. When class confidence is a recognition result, a value calculated by the image information regression unit 204 may be acquired as class confidence by preparing a vector corresponding to a class such as a person, an object, or a character, inputting 0 or 1 (0 indicating that the object does not exist and 1 indicating that the object exists) to each element of the vector, and performing calculation, based on the input, similarly to regular image recognition. Alternatively, when class confidence is a recognition result, a value output by the image information regression unit 204 may be acquired as class confidence by preparing a vector corresponding to a class such as a person, an object, or a character, inputting confidence of each object (the object being more likely to exist with increase in confidence) to each element of the vector, and performing calculation, based on the input, similarly to regular image recognition. Class confidence of a reference image Ii is hereinafter denoted by $c_i(t_i)=(c_1(t_i), c_2(t_i), \ldots, c_d(t_i), \ldots, c_D(t_i))$. Note that D denotes the dimension of the reference image, and d denotes an index for distinguishing between dimensions. For example, when class confidence is a recognition result, D denotes the number of classes.

An image information regression function used for calculating class confidence $c_i(t_i)$ in the present example embodiment may be given by advance manual input by a user. Alternatively, the image information regression function may be separately estimated by using the configuration illustrated in FIG. 2. Further, for example, the image information regression function may be estimated by using the technique described in Non Patent Literature 1. Further, the image information regression function may use a regression function by a deep neural network or a regression function using a random forest. Alternatively, the image information regression function may be acquired by support vector regression.

Difference Image Information Regression Unit 205

The difference image information regression unit 205 calculates adjacent class confidence $c_{ij}(t_j)$ by a difference image information regression function with a variation calculated by the variation calculation unit 203 as an input. For example, adjacent class confidence $c_{ij}$ herein refers to a matching result or a recognition result, similarly to class confidence $c_i(t_i)$. More specifically, for example, when adjacent class confidence $c_{ij}(t_j)$ is a matching result, a degree of difference or a degree of similarity between an input reference image or a difference image according to an input variation, and a separately prepared image corresponds to adjacent class confidence, similarly to class confidence $c_i(t_i)$. When adjacent class confidence $c_{ij}(t_j)$ is a recognition result, class confidence of an object, a person, a character, or the like included in an input reference image or a difference image according to an input variation corresponds to adjacent class confidence.

A difference image information regression function used for calculating adjacent class confidence cij(tj) in the present example embodiment may be given by advance manual input by a user. Alternatively, the difference image information regression function may be estimated by separately using the configuration illustrated in FIG. 2. Further, for example, the difference image information regression function may be estimated by using the technique described in Non Patent Literature 1. Further, the difference image information regression function may use a regression function by a deep neural network or a regression function using a random forest. Alternatively, the difference image information regression function may be acquired by support vector regression.

Confidence Integration Unit 206

The confidence integration unit 206 calculates integrated class confidence into which adjacent class confidence cij(tj) calculated by the difference image information regression unit 205 and class confidence ci(ti) calculated by the image information regression unit 204 are integrated. For example, integrated class confidence herein refers to a matching result or a recognition result, similarly to class confidence and adjacent class confidence. More specifically, for example, when integrated class confidence is a matching result, a degree of difference or a degree of similarity between a reference image or a difference image based on a variation, and a separately prepared image corresponds to integrated class confidence. When integrated class confidence is a recognition result, information about an object, a person, a character, or the like included in a reference image corresponds to integrated class confidence. When integrated class confidence is a recognition result, a value calculated by the confidence integration unit 206 may be acquired as integrated class confidence by preparing a vector corresponding to a class such as a person, an object, or a character, inputting 0 or 1 (0 indicating that the object does not exist and 1 indicating that the object exists) to each element of the vector, and performing calculation, based on the input, similarly to regular image recognition. Alternatively, when integrated class confidence is a recognition result, a value calculated by the confidence integration unit 206 may be acquired as integrated class confidence by preparing a vector corresponding to a class such as a person, an object, or a character, inputting confidence of each object (the object being more likely to exist with increase in confidence) to each element of the vector, and performing calculation, based on the input, similarly to regular image recognition.

For example, the confidence integration unit 206 may integrate class confidence ci(ti) and adjacent class confidence cij(tj) by calculating the sum, the mean value, the median value, or the maximum value of the class confidence ci(ti) and the adjacent class confidence cij(tj), or a combined value thereof. Alternatively, the confidence integration unit 206 may integrate class confidence ci(ti) and adjacent class confidence cij(tj) by calculating the product of the class confidence ci(ti) and the adjacent class confidence cij(tj). Alternatively, the confidence integration unit 206 may integrate class confidence ci(ti) and adjacent class confidence cij(tj) by setting a certain linear or nonlinear function with pixel values of a reference image and a difference image as arguments, substituting the pixel values of the reference image and the difference image into the function, and calculating the acquired output as integrated class confidence. Alternatively, the confidence integration unit 206 may vote on confidence by a voting method such as plurality voting or simple soft voting.

The output unit 301 outputs integrated class confidence calculated by the confidence integration unit 206.

Next, an outline of each component in the learning execution unit in the image processing system illustrated in FIG. 2 will be described.

Learning Sequential Image String Input Unit 102

The learning sequential image string input unit 102 inputs a sequential image string having sequentiality and being previously prepared for learning (may be hereinafter referred to as a learning sequential image string). For example, a sequential image string herein refers to one or more dynamic images captured by a video camera or a high-speed camera. Alternatively, for example, a sequential image string herein may be a series of image strings captured with varying poses of a subject such as a face, a person, or an object. Alternatively, for example, a sequential image string herein may be a series of image strings of a subject such as a face, a person, or an object captured with varying positions of lighting or a camera. Alternatively, a sequential image string herein may be a multispectral image or a hyperspectral image of a subject such as a face, a person, or an object captured in a plurality of spectral bands. In other words, a sequential image string herein may be any image sequential string acquired by temporally or spatially varying a subject or an image capture environment, based on a certain rule. A set of images input by the learning sequential image string input unit 102 is hereinafter denoted by $\{I_k(t)\} = (I_1(t), \ldots, I_k(t), \ldots, I_K(t))$, and the set may be hereinafter referred to as a learning sequential image group. Note that k denotes an index for distinguishing between input learning sequential images, and K denotes the total number of the input learning sequential images.

Preprocessing Unit 201a

The preprocessing unit 201a converts a learning sequential image string input by the learning sequential image string input unit 102 into images more suitable for image recognition by performing preprocessing (image processing) on the learning sequential image string. An outline of operation of the preprocessing unit 201a is similar to that of the preprocessing unit 201 in FIG. 1, and therefore description thereof is omitted.

Learning Reference Image Selection Unit 202a

The learning reference image selection unit 202a selects one or more images from a learning sequential image string preprocessed by the preprocessing unit 201a as learning reference images. An outline of operation of the learning reference image selection unit 202a is similar to that of the reference image selection unit 202 in FIG. 1, and therefore description thereof is omitted. Further, a learning reference image selected by the learning reference image selection unit 202a is hereinafter denoted by $\{I_{ki}(t_i)\}$ or simply $\{I_{ki}\}$.

Variation Calculation Unit 203a

The variation calculation unit 203a calculates a variation between a learning reference image selected by the learning reference image selection unit 202a and an adjacent learning reference image being an image adjacent to the learning reference image. An outline of operation of the variation calculation unit 203a is similar to that of the variation calculation unit 203 in FIG. 1, and therefore description thereof is omitted. Further, an adjacent learning reference image is hereinafter denoted by $\{I_{kij}(t_j)\}$, and a calculated variation is denoted by $\{\Delta I_{kij}\}$.

Teacher Image Information Input Unit 103

The teacher image information input unit 103 inputs image information to be teacher data as teacher image information. An output similar to an output expected when an image information regression function similar to an image information regression function used by the image information regression unit 204 in FIG. 1 is used for a learning reference image $\{Iki\}$ or a learning adjacent reference image $\{Ikij\}$ (that is, a correct answer value or a teacher signal) may be used as teacher image information in the present example embodiment.

In other words, teacher image information input by the teacher image information input unit 103 refers to a correct answer value (or a teacher signal) such as a matching result or a recognition result. More specifically, for example, when teacher image information is a matching result, a degree of difference or a degree of similarity between a learning reference image or a difference image based on a variation, and separately prepared image corresponds to teacher image information. When teacher image information is a recognition result, information about an object, a person, a character, or the like included in a learning reference image corresponds to teacher image information. When teacher image information is a recognition result, a value input by the teacher image information input unit 103 may be acquired as teacher image information by preparing a vector corresponding to a class such as a person, an object, or a character, inputting 0 or 1 (0 indicating that the object does not exist and 1 indicating that the object exists) to each element of the vector, and determining the resulting vector as the input, similarly to regular image recognition. Alternatively, when teacher image information is a recognition result, a value input by the teacher image information input unit 103 may be acquired as teacher image information by preparing a vector corresponding to a class such as a person, an object, or a character, inputting confidence of each object (the object being more likely to exist with increase in confidence) to each element of the vector, and determining the resulting vector as the input, similarly to a teacher signal in regular image recognition. Teacher image information related to a learning reference image $\{Iki\}$ is hereinafter denoted by $\{zki\}$, and teacher image information related to a variation $\{\Delta Ikij\}$ or teacher image information related to a difference image according to the variation $\{\Delta Ikij\}$ is denoted by $\{zkij\}$.

Image Information Regression Function Estimation Unit 204a

The image information regression function estimation unit 204a estimates an image information regression function from a learning reference image $\{Iki\}$ selected by the learning reference image selection unit 202a and teacher image information $\{zki\}$ input by the teacher image information input unit 103. In other words, the image information regression function estimation unit 204a estimates an image information regression function with a learning reference image $\{Iki\}$ and teacher image information $\{zki\}$ as inputs. For example, the image information regression function estimation unit 204a may estimate an image information regression function by deep learning. More specifically, for example, the image information regression function estimation unit 204a may regress an image information regression function by using a technique such as an autoencoder or a variational autoencoder (VAE). Alternatively, the image information regression function estimation unit 204a may calculate an image information regression function by using a method such as support vector regression or a random forest.

Difference Image Information Regression Function Estimation Unit 205a

The difference image information regression function estimation unit 205a estimates a difference image information regression function from a variation $\{\Delta Ikij\}$ between a learning reference image $\{Iki\}$ calculated by the variation calculation unit 203a and a learning adjacent reference image $\{Ikij\}$, and teacher image information $\{zkij\}$ input by the teacher image information input unit 103. In other words, the difference image information regression function estimation unit 205a estimates a difference image information regression function with a variation $\{\Delta Ikij\}$ and teacher image information $\{zkij\}$ as inputs. For example, the difference image information regression function estimation unit 205a may estimate a difference image information regression function by deep learning. More specifically, for example, the difference image information regression function estimation unit 205a may regress a difference image information regression function by using a technique such as an autoencoder or a variational autoencoder (VAE). Alternatively, the difference image information regression function estimation unit 205a may calculate a difference image information regression function by using a method such as support vector regression or a random forest.

Image Information Regression Function Output Unit 302

The image information regression function output unit 302 outputs an image information regression function estimated by the image information regression function estimation unit 204a. The image information regression unit 204 in FIG. 1 may use an image information regression function output from the image information regression function output unit 302 or an image information regression function manually input by a user in advance.

Difference Image Information Regression Function Output Unit 303

The difference image information regression function output unit 303 outputs a difference image information regression function estimated by the difference image information regression function estimation unit 205a. The difference image information regression unit 205 in FIG. 1 may use a difference image information regression function output from the difference image information regression function output unit 303 or a difference image information regression function manually input by a user in advance.

Operation of Example Embodiment

Operation of the image processing system according to the present example embodiment will be described below.

Figure 5:
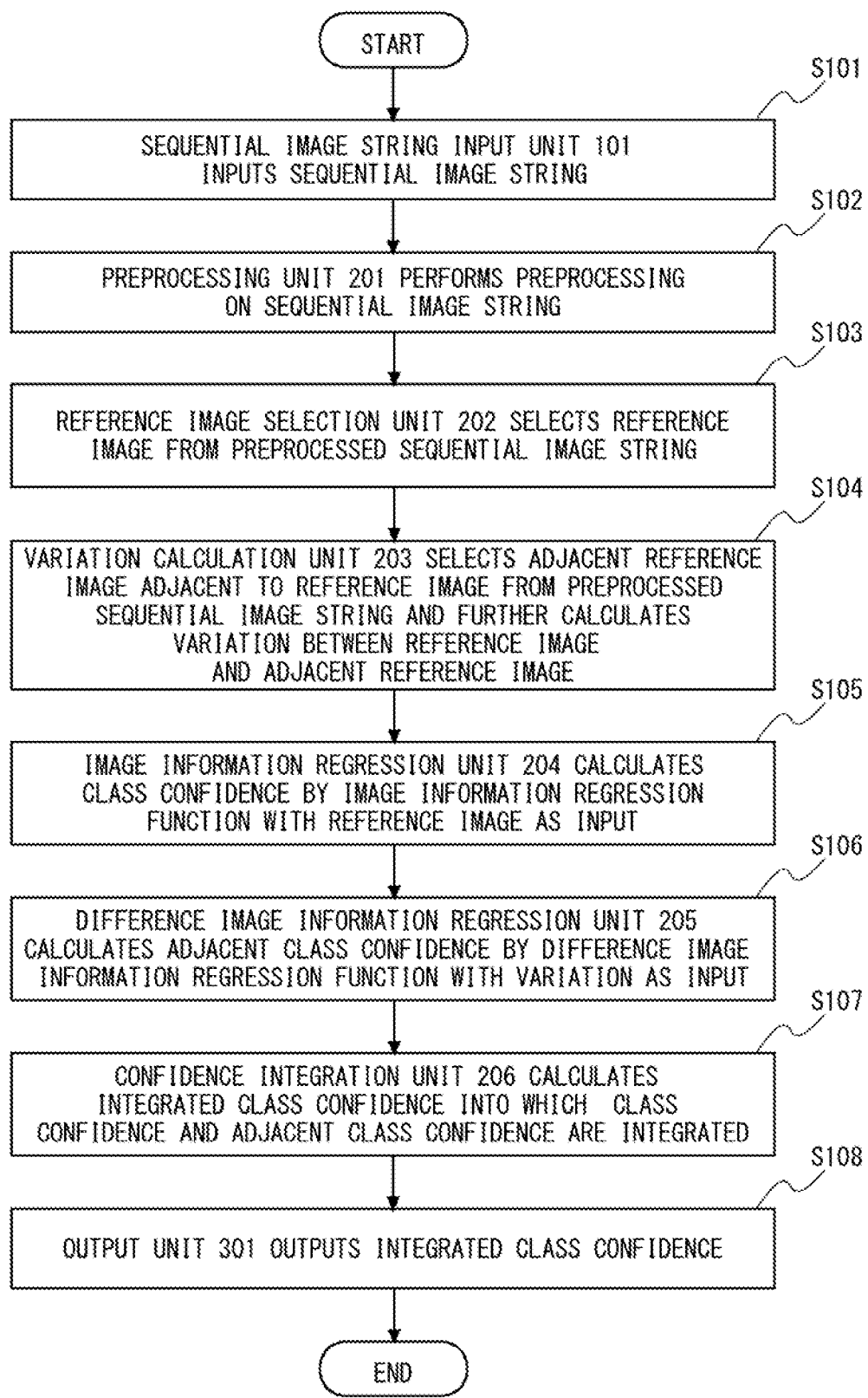
FIG. 5 is a flowchart illustrating an operation flow example of the inference execution unit in the image processing system illustrated in FIG. 1.

First, operation of the inference execution unit in the image processing system illustrated in FIG. 1 will be described with reference to FIG. 5. FIG. 5 is a flowchart illustrating an operation flow example of the inference execution unit in the image processing system illustrated in FIG. 1.

Referring to FIG. 5, first, the sequential image string input unit 101 inputs a sequential image string (S101).

Next, the preprocessing unit 201 performs preprocessing on the sequential image string input by the sequential image string input unit 101 (S102).

Next, the reference image selection unit 202 selects a reference image from the sequential image string preprocessed by the preprocessing unit 201 (S103).

Next, the variation calculation unit 203 selects an adjacent reference image adjacent to the reference image selected by the reference image selection unit 202 from the sequential image string preprocessed by the preprocessing unit 201 and further calculates a variation between the reference image and the adjacent reference image (S104).

Next, the image information regression unit 204 calculates class confidence by a reference image information regression function with the reference image selected by the reference image selection unit 202 as an input (S105).

Next, the difference image information regression unit 205 calculates adjacent class confidence by a difference image information regression function with the variation calculated by the variation calculation unit 203 as an input (S106).

Next, the confidence integration unit 206 calculates integrated class confidence into which the class confidence calculated by the image information regression unit 204 and the adjacent class confidence calculated by the difference image information regression unit 205 are integrated (S107).

Subsequently, the output unit 301 outputs the integrated class confidence calculated by the confidence integration unit 206 (S108).

Figure 6:
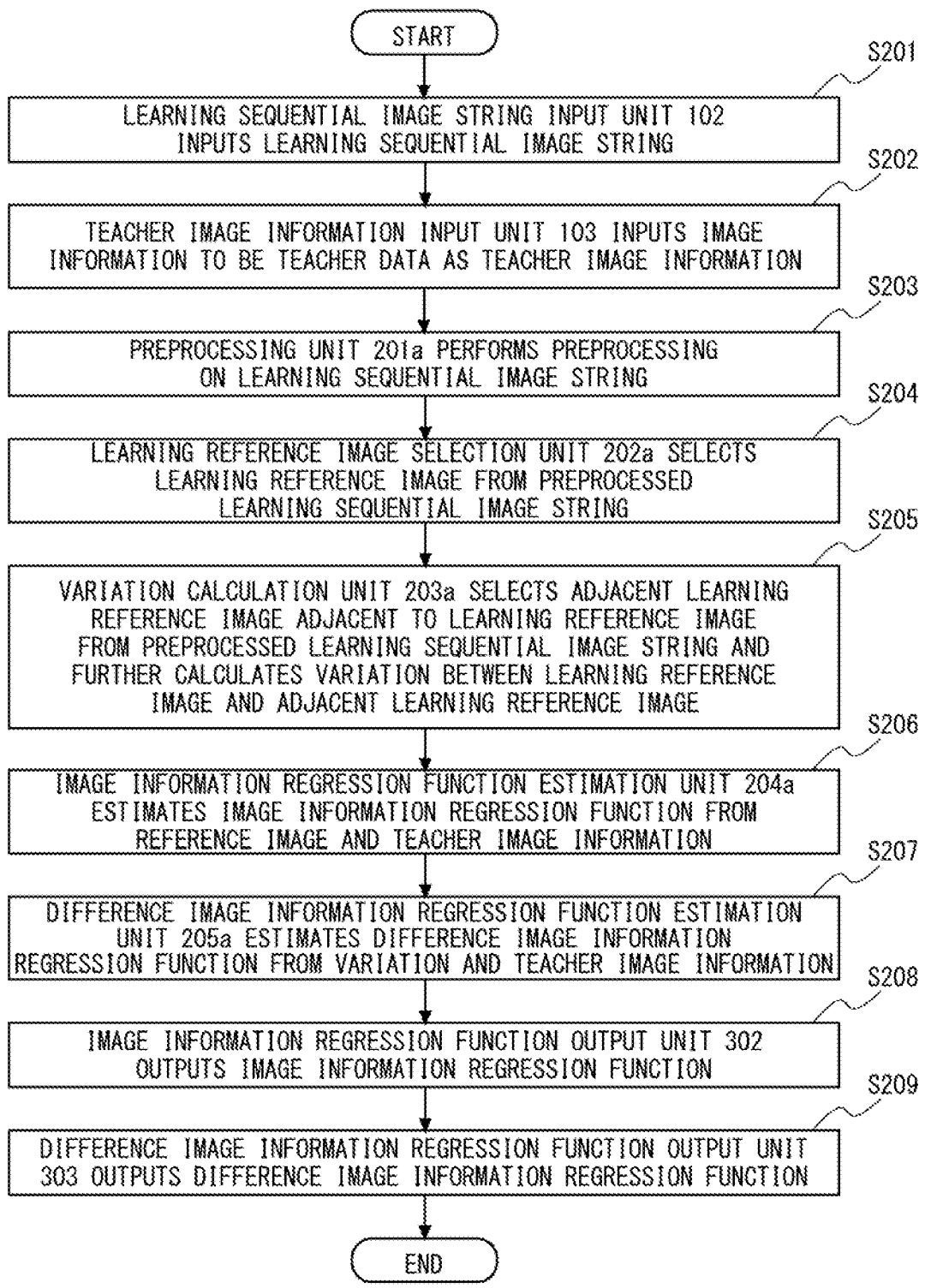
FIG. 6 is a flowchart illustrating an operation flow example of the learning execution unit in the image processing system illustrated in FIG. 2.

Next, operation of the learning execution unit in the image processing system illustrated in FIG. 2 will be described with reference to FIG. 6. FIG. 6 is a flowchart illustrating an operation flow example of the learning execution unit in the image processing system illustrated in FIG. 2.

Referring to FIG. 6, first, the learning sequential image string input unit 102 inputs a learning sequential image string (S201).

Next, the teacher image information input unit 103 inputs image information to be teacher data as teacher image information (S202).

Next, the preprocessing unit 201*a* performs preprocessing on the learning sequential image string input by the learning sequential image string input unit 102 (S203).

Next, the learning reference image selection unit 202*a* selects a learning reference image from the learning sequential image string preprocessed by the preprocessing unit 201*a* (S204).

Next, the variation calculation unit 203*a* selects an adjacent learning reference image adjacent to the learning reference image selected by the learning reference image selection unit 202*a* from the learning sequential image string preprocessed by the preprocessing unit 201*a* and further calculates a variation between the learning reference image and the adjacent learning reference image (S205).

Next, the image information regression function estimation unit 204*a* estimates an image information regression function from the learning reference image selected by the learning reference image selection unit 202*a* and the teacher image information input by the teacher image information input unit 103 (S206).

Further, the difference image information regression function estimation unit 205*a* estimates a difference image information regression function from the variation calculated by the variation calculation unit 203*a* and the teacher image information input by the teacher image information input unit 103 (S207).

Subsequently, the image information regression function output unit 302 outputs the image information regression function estimated by the image information regression function estimation unit 204*a* (S208).

Further, the difference image information regression function output unit 303 outputs the difference image information regression function estimated by the difference image information regression function estimation unit 205*a* (S209).

Effects of Example Embodiment

Effects of the image processing system according to the present example embodiment will be described below.

(1) First Effect

A first effect of the present example embodiment is that, when a dynamic image having a high frame rate and being acquired by using a high-speed camera, an image group of an object captured under a plurality of lighting conditions, or the like is input, image processing such as image recognition can be performed with a lighter computational load.

The reason is described below. According to the present example embodiment, first, the variation calculation unit 203 calculates a variation between a reference image and an adjacent reference image being an image adjacent to the reference image. Next, the image information regression unit 204 calculates class confidence by an image information regression function with the reference image as an input; and then the difference image information regression unit 205 calculates class confidence by a difference image information regression function with only the variation as an input. Next, the confidence integration unit 206 integrates the two types of confidence. The present example embodiment is thus structured.

A change between images along a sequence is generally small compared with a value of an image itself (that is, a pixel value). Thus, when a variation is relatively small, a computational load in a difference image information regression function is kept light. Therefore, as a result, a computational cost required for estimation and execution (inference) of the difference image information regression function is kept low. In other words, estimation and execution (that is, inference) of the difference image information regression function can be performed at a higher speed.

From a different point of view, for example, a case of configuring an image information regression function and a difference image information regression function with neural networks is considered (see FIG. 3 and FIG. 4). In this case, attention can be focused only on a relative change between images by using a difference image based on a variation, and therefore layers in previous stages required when a regular image is used can be reduced. Therefore, a computational cost can be lowered compared with a case of not using a difference image. In other words, estimation and execution (that is, inference) of the difference image information regression function can be performed at a higher speed.

(2) Second Effect

In addition, a second effect of the present example embodiment is that image recognition can be performed stably. The reason is that, as described above, the present example embodiment is structured to integrate class confidence calculated by the image information regression unit 204 and class confidence calculated by the difference image information regression unit 205.

Therefore, since an image is recognized by also using class confidence output by the difference image information regression unit 205, image recognition can be performed by using a larger amount of information compared with a case of recognizing an image by using only one image. The reason is that, for example, even when class confidence calculated by the image information regression unit 204 is ambiguous or erroneous, an image can be correctly recognized as long as class confidence calculated by the difference image information regression unit 205 is correct.

From a different point of view, an image feature is generally described with differential information in a spatial direction (that is, spatial difference information) as a feature value in image recognition. The reason is that information such as an outline of an object can be more emphatically described by a spatial change of brightness information than by a brightness value itself, and recognition performance is thereby improved. On the other hand, a case of the sequential image string input unit 101 inputting a time-series images captured by using a high-speed camera or the like, movement relative to a target object being slightly different between the images, is considered. Information such as a change in the outline of the object can be emphatically described by not only calculating a spatial change in the brightness value from the time-series images but also calculating a temporal change in the brightness value and using the change as a feature. In other words, a variation calculated by the variation calculation unit 203 is information emphasizing a change in an outline of an object or the like, and by configuring a difference information regression function by using the variation, recognition performance can be improved.

(3) Third Effect

In addition, a third effect of the present example embodiment is that image recognition can be performed from a smaller amount of learning data. The reason is that, as described above, a change in a pixel value between images along a sequence is generally smaller compared with a value of an image itself (that is, a pixel value) and therefore a variation calculated by the variation calculation unit 203a takes a relatively small value. Thus, a relatively small variation allows a narrow search range of a function when a difference image information regression function is estimated. Therefore, an amount of learning data required for stable estimation of the function can be decreased.

Figure 7:
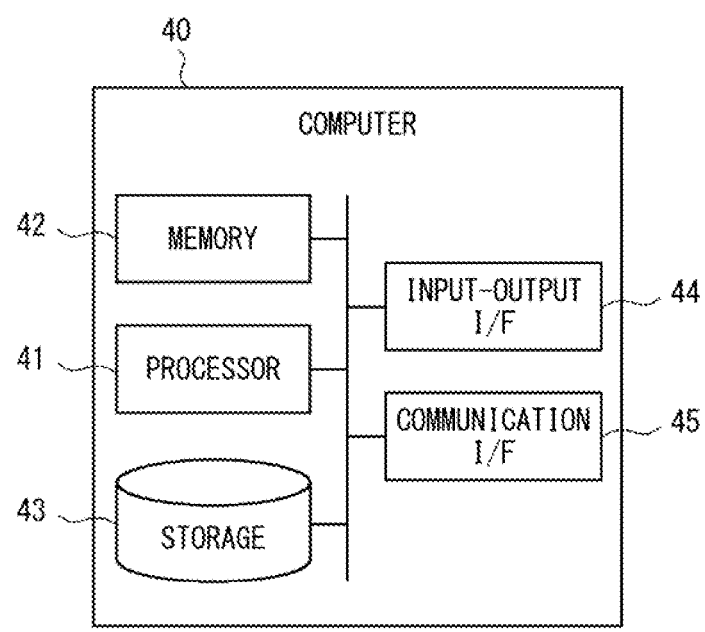
FIG. 7 is a block diagram illustrating a hardware configuration example of a computer providing the image processing system illustrated in FIG. 1 and FIG. 2.

The image processing system according to the present example embodiment can be provided by a single computer (image processing device). A hardware configuration of a computer 40 providing the image processing system according to the present example embodiment will be described below with reference to FIG. 7. FIG. 7 is a block diagram illustrating a hardware configuration example of the computer 40 providing the image processing system according to the present example embodiment.

Referring to FIG. 7, the image processing system according to the present example embodiment can be provided by the computer 40. The computer 40 includes a processor 41, a memory 42, a storage 43, an input-output interface (input-output I/F) 44, and a communication interface (communication I/F) 45. The processor 41, the memory 42, the storage 43, the input-output interface 44, and the communication interface 45 are connected by a data transmission channel for transmitting and receiving data to and from one another.

Examples of the processor 41 include arithmetic processing units such as a central processing unit (CPU) and a graphics processing unit (GPU). Examples of the memory 42 include memories such as a random access memory (RAM) and a read only memory (ROM). Examples of the storage 43 include a storage device such as a hard disk drive (HDD), a solid state drive (SSD), or a memory card. Further, the storage 43 may be a memory such as a RAM or a ROM.

The storage 43 stores programs (image processing programs) providing functions of components included in the image processing system according to the present example embodiment. By executing each program, the processor 41 provides a function of each component included in the image processing system according to the present example embodiment. When executing each of the aforementioned programs, the processor 41 may execute the program after reading the program into the memory 42 or may execute the program without reading the program into the memory 42.

Further, the aforementioned programs may be stored by using various types of non-transitory computer-readable media and be supplied to a computer (including the computer 40). The non-transitory computer-readable media include various types of tangible storage media. Examples of the non-transitory computer-readable medium include magnetic storage media (such as a flexible disk, a magnetic tape, and a hard disk drive), magneto-optical storage media (such as a magneto-optical disk), a compact disc-read only memory (CD-ROM), a CD-recordable (CD-R), a CD-rewritable (CD-R/W), and semiconductor memories [such as a mask ROM, a programmable ROM (PROM), an erasable PROM (EPROM), a flash ROM, and a random access memory (RAM)]. Further, the programs may be supplied to the computer by various types of transitory computer-readable media. Examples of the transitory computer-readable medium include an electric signal, an optical signal, and an electromagnetic wave. The transitory computer-readable medium can supply the programs to the computer through a wired communication channel such as an electric cable or an optical fiber, or a wireless communication channel.

The input-output interface 44 is connected to an unillustrated display device, an unillustrated input device, or the like. For example, the display device is a device, such as a liquid crystal display (LCD) or a cathode ray tube (CRT) display, displaying a screen related to drawing data processed by the processor 41. Further, for example, the input device is a device receiving an operational input by an operator; and examples of the input device include a keyboard, a mouse, and a touch sensor. The display device and the input device may be integrated and be provided as a touch panel.

The communication interface 45 transmits and receives data to and from an external device. For example, the communication interface 45 communicates with the external device through a wired network or a wireless network.

While the present disclosure has been described above with reference to the example embodiment, the present disclosure is not limited to the aforementioned example embodiment. Various changes and modifications that may be understood by a person skilled in the art may be made to the configurations and details of the present disclosure, within the scope of the present disclosure.

For example, the image processing system according to the present disclosure may form a minimum configuration with the components illustrated in FIG. 1 excluding the preprocessing unit 201. The minimum configuration also provides the effects of the present disclosure and can solve the problem to be solved by the present disclosure.

REFERENCE SIGNS LIST

101 SEQUENTIAL IMAGE STRING INPUT UNIT
20 INFERENCE PROCESSING UNIT
201 PREPROCESSING UNIT
202 REFERENCE IMAGE SELECTION UNIT
203 VARIATION CALCULATION UNIT
204 IMAGE INFORMATION REGRESSION UNIT
205 DIFFERENCE IMAGE INFORMATION REGRESSION UNIT
206 CONFIDENCE INTEGRATION UNIT
301 OUTPUT UNIT
102 LEARNING SEQUENTIAL IMAGE STRING INPUT UNIT
103 TEACHER IMAGE INFORMATION INPUT UNIT
21 LEARNING PROCESSING UNIT
201a PREPROCESSING UNIT
202a LEARNING REFERENCE IMAGE SELECTION UNIT
203a VARIATION CALCULATION UNIT
204a IMAGE INFORMATION REGRESSION FUNCTION ESTIMATION UNIT

205a DIFFERENCE IMAGE INFORMATION REGRESSION FUNCTION ESTIMATION UNIT
302 IMAGE INFORMATION REGRESSION FUNCTION OUTPUT UNIT
303 DIFFERENCE IMAGE INFORMATION REGRESSION FUNCTION OUTPUT UNIT
40 COMPUTER
41 PROCESSOR
42 MEMORY
43 STORAGE
44 INPUT-OUTPUT INTERFACE
45 COMMUNICATION INTERFACE

What is claimed is:

1. An image processing system comprising:
a sequential image string input unit configured to input a sequential image string having sequentiality;
a reference image selection unit configured to select one or more images from the sequential image string as reference images;
a first variation calculation unit configured to select an adjacent reference image adjacent to the reference image from the sequential image string and calculate a first variation being a variation between the reference image and the adjacent reference image;
an image information regression unit configured to calculate class confidence by regression processing with the reference image as an input;
a difference image information regression unit configured to calculate class confidence by regression processing with the first variation as an input;
a confidence integration unit configured to integrate class confidence calculated by the image information regression unit and class confidence calculated by the difference image information regression unit; and
an output unit configured to output the integrated class confidence.

2. The processing system according to claim 1, wherein the image information regression unit calculates class confidence by regression processing using an image information regression function with the reference image as an input, and
the difference image information regression unit calculates class confidence by regression processing using a difference image information regression function with the first variation as an input.

3. The processing system according to claim 2, further comprising:
a learning sequential image string input unit configured to input a learning sequential image string having sequentiality;
a teacher image information input unit configured to input image information to be teacher data as teacher image information;
a learning reference image selection unit configured to select one or more images from the learning sequential image string as learning reference images;
a second variation calculation unit configured to select an adjacent learning reference image adjacent to the learning reference image from the learning sequential image string and calculate a second variation being a variation between the learning reference image and the adjacent learning reference image;
an image information regression function estimation unit configured to estimate the image information regression function from the teacher image information and the learning reference image; and a difference image information regression function estimation unit configured to estimate the difference image information regression function from the teacher image information and the second variation, wherein
the image information regression unit uses an image information regression function estimated by the image information regression function estimation unit as the image information regression function, and
the difference image information regression unit uses a difference image information regression function estimated by the difference image information regression function estimation unit as the difference image information regression function.

4. The processing system according to claim 1, wherein the reference image selection unit selects an image in a specific frame from the sequential image string as the reference image, and
the first variation calculation unit
selects an image in a frame subsequent to the reference image from the sequential image string as the adjacent reference image and calculates a variation between the reference image and the adjacent reference image, and,
from then on, repeats an operation of successively selecting an image in a frame after a current adjacent reference image from the sequential image string as the adjacent reference image and calculating a variation between the selected adjacent reference image and the reference image.

5. The processing system according to claim 1, wherein the reference image selection unit selects an image in a specific frame from the sequential image string as the reference image, and
the first variation calculation unit
selects an image in a frame subsequent to the reference image from the sequential image string as the adjacent reference image and calculates a variation between the reference image and the adjacent reference image, and,
from then on, repeats an operation of successively selecting an image in a frame after a current adjacent reference image from the sequential image string as the adjacent reference image and calculating a variation between the selected adjacent reference image and the adjacent reference image in an immediately preceding frame.

6. An image processing device comprising:
a sequential image string input unit configured to input a sequential image string having sequentiality;
a reference image selection unit configured to select one or more images from the sequential image string as reference images;
a first variation calculation unit configured to select an adjacent reference image adjacent to the reference image from the sequential image string and calculate a first variation being a variation between the reference image and the adjacent reference image;
an image information regression unit configured to calculate class confidence by regression processing with the reference image as an input;
a difference image information regression unit configured to calculate class confidence by regression processing with the first variation as an input;
a confidence integration unit configured to integrate class confidence calculated by the image information regression unit and class confidence calculated by the difference image information regression unit; and an output unit configured to output the integrated class confidence.

7. An image processing method by an image processing device, the method comprising:
- a step of inputting a sequential image string having sequentiality;
- a step of selecting one or more images from the sequential image string as reference images;
- a step of selecting an adjacent reference image adjacent to the reference image from the sequential image string and calculating a first variation being a variation between the reference image and the adjacent reference image;
- a first regression step of calculating class confidence by regression processing with the reference image as an input;
- a second regression step of calculating class confidence by regression processing with the first variation as an input;
- a step of integrating class confidence calculated by the first regression step and class confidence calculated by the second regression step; and
- a step of outputting the integrated class confidence.

* * * * *